Patented Dec. 5, 1922.

1,437,615

UNITED STATES PATENT OFFICE.

AMÉ PICTET, OF GENEVA, SWITZERLAND, ASSIGNOR TO SOCIETY OF CHEMICAL INDUSTRY IN BASLE, OF BASEL, SWITZERLAND.

PROCESS FOR THE MANUFACTURE OF LEVOGLUCOSANE.

No Drawing. Application filed November 1, 1918. Serial No. 260,756.

*To all whom it may concern:*

Be it known that I, AMÉ PICTET, professor, a citizen of the Swiss Republic, and resident of Geneva, Switzerland, have invented a new and useful Process for the Manufacture of Levoglucosane, of which the following is a full, clear, and exact specification.

The levoglucosane ($C_6H_{10}O_5$) has been obtained hitherto only by decomposing certain glucosides (piceine, coniferine, salicine, apiine) by their long boiling with an aqueous solution of barium-hydroxide or with soda lye (Tanret, Bulletin de la Société Chimique de Paris (3) II 949—Vongerichten and Müller, Berichte der deutschen chemischen Gesellschaft 39, 241. I have found that the same compound is formed when carbohydrates belonging to the group of polysaccharides and having molecular weights greater than that of trisaccharides as cellulose, starch or dextrine or a vegetable substance containing such carbohydrates are subjected to a dry distillation at a pressure of 12 to 30 mm. of mercury at a temperature of 200 to 300° C.

As Tanret had observed, the levoglucosane, which is itself not fermentable, becomes fermentable after it has been boiled with dilute mineral acids. It is thereby converted into ordinary glucose. The present process for the manufacture of levoglucosane provides therefore a practical means for manufacturing sugar and alcohol from carbohydrates of high molecular weights belonging to the polysaccharides particularly from cellulose and from the substances containing such carbohydrates.

The invention is illustrated by the following examples:

*Example 1.*—100 parts of carbohydrate in form of cellulose (for instance of cotton) or of starch, are introduced into a retort connected on the one hand with a vessel immersed in water of 50° C. and on the other hand with one or several vessels cooled down by a mixture of ice and salt. The pressure in the apparatus is reduced to 12–15 mm. of mercury and the retort is gradually heated. Up to 200° C., water (32 parts) is distilled and is condensed in the cooled vessels. Between 200° and 300° C. a yellow thick oil (45 parts) is distilled, which concretes to a paste in the vessel heated to 50° C. The glucosane is contained exclusively in the said paste. In order to extract the glucosane from this latter, it is treated with boiling acetone, the mass is filtered hot and the filtered liquid highly concentrated. The glucosane crystallizes on cooling. Its purification is completed by a second crystallization from a small quantity of hot water. The body thus purified is perfectly white, melts at 179.5° C. and shows all the properties described by Tanret.

*Example 2.*—100 parts of not previously dried sawdust are distilled in a vacuum of 30 mm. at a temperature ranging between 200 and 300° C. All products of the distillation are condensed together in a single vessel. There is thus obtained an aqueous solution of levoglucosane from which this latter can be isolated by evaporation. The aqueous solution can also be used directly for the manufacture of alcohol. For this purpose a little dilute sulfuric acid is added to the solution and this latter boiled for 4 to 5 hours, whereby the levoglucosane is transformed into glucose and simultaneously a small quantity of phenols and of terpenic substances is eliminated. After the solution has been cooled down, the sulfuric acid is neutralized by barium carbonate, the mass is filtered, to the filtrate are added beer yeast and the necessary mineral salts and fermentation is allowed to proceed. The alcohol produced is separated by the usual processes.

What I claim is:

1. The herein described process for the manufacture of levoglucosane, which consists in subjecting carbohydrates, belonging to the group of polysaccharides and having molecular weights greater than that of trisaccharides, to a dry distillation at a pressure of 12 to 30 mm. of mercury at a temperature of 200 to 300° C.

2. The herein described process for the manufacture of levoglucosane, which consists in subjecting vegetable substances containing carbohydrates, belonging to the group of polysaccharides and having molecular weights greater than that of trisaccharides, to a dry distillation at a pressure of 12 to 30 mm. of mercury at a temperature of 200 to 300° C.

In witness whereof I have hereunto signed my name this 25th day of September 1918, in the presence of two subscribing witnesses.

AMÉ PICTET.

Witnesses:
 LOUIS H. MUNIERY,
 LEWIS W. HASKELL.